(12) United States Patent
Hatanaka

(10) Patent No.: US 11,090,951 B2
(45) Date of Patent: Aug. 17, 2021

(54) LIQUID DISCHARGE APPARATUS AND METHOD FOR MANUFACTURING LAMINATION PRINT

(71) Applicant: Ricoh Company, Ltd., Tokyo (JP)

(72) Inventor: Shinichi Hatanaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/816,307

(22) Filed: Mar. 12, 2020

(65) Prior Publication Data

US 2020/0298592 A1 Sep. 24, 2020

(30) Foreign Application Priority Data

Mar. 20, 2019 (JP) .............................. JP2019-052681

(51) Int. Cl.
*B41J 11/00* (2006.01)
*B41J 2/21* (2006.01)

(52) U.S. Cl.
CPC ............ *B41J 11/002* (2013.01); *B41J 2/2114* (2013.01); *B41J 2/2132* (2013.01)

(58) Field of Classification Search
CPC ........ B41J 11/002; B41J 2/2132; B41J 2/2114
See application file for complete search history.

(56) References Cited

U.S. PATENT DOCUMENTS

| 8,995,022 B1* | 3/2015 | Vronsky ............. H01L 51/5237 358/3.06 |
| 2012/0242767 A1* | 9/2012 | Kondo ....................... B41J 2/01 347/102 |
| 2015/0306891 A1 | 10/2015 | Sohgawa et al. |
| 2015/0328908 A1 | 11/2015 | Hatanaka |

FOREIGN PATENT DOCUMENTS

| JP | 2013-123806 | 6/2013 |
| JP | 2015-208927 | 11/2015 |
| JP | 2015-217574 | 12/2015 |
| JP | 2016-037007 | 3/2016 |
| JP | 2017-213711 | 12/2017 |
| JP | 2018-052131 | 4/2018 |
| JP | 2018-166011 | 10/2018 |
| JP | 2018-187936 | 11/2018 |

* cited by examiner

*Primary Examiner* — Justin Seo
(74) *Attorney, Agent, or Firm* — Xsensus LLP

(57) ABSTRACT

A liquid discharge apparatus includes a liquid discharge head, a stimulation imparting unit, and a control unit. The liquid discharge head discharges stimulation hardening resin. The stimulation imparting unit imparts hardening stimulation to the discharged stimulation hardening resin. The control unit: controls the liquid discharge head based on lamination print data; forms a plurality of print layers each having a contour part; and changes a distance from the contour part in each of the print layers, based on data representing a correction amount with respect to a distance from the contour part in each of the print layers and a number of the print layers.

20 Claims, 6 Drawing Sheets

LIQUID DISCHARGE APPARATUS AND METHOD FOR MANUFACTURING LAMINATION PRINT

CROSS-REFERENCE TO RELATED APPLICATIONS

The present application claims priority under 35 U.S.C. § 119 to Japanese Patent Application No. 2019-052681, filed on Mar. 20, 2019. The contents of which are incorporated herein by reference in their entirety.

BACKGROUND OF THE INVENTION

1. Field of the Invention

The present invention relates to a liquid discharge apparatus and a method for manufacturing a lamination print.

2. Description of the Related Art

Conventionally, there is known a liquid discharge apparatus, for example, an inkjet printer, which includes a liquid discharge head or a liquid discharge unit and drives the liquid discharge head to discharge liquid.

In relation to the liquid discharge apparatus, there is known a technique of forming a stereoscopic object by discharging light hardening resin, and hardening and laminating the light hardening resin. However, in such a technique, a contour part of the stereoscopic object protrudes, and a flat and smooth surface is unlikely to be obtained in practice even when the surface is a flat and smooth surface on data.

For the purpose of reducing protrusion of a contour part, there is known a method for reducing protrusion of the contour part by intermittently removing droplets forming a contour part of a color image or a method for visually reducing perception of protrusion by applying coloring with low brilliance to a contour part (for example, see Japanese Unexamined Patent Application Publication No. 2013-123806).

However, it is difficult for the conventional technique to sufficiently deal with protrusion of a contour part in print that is formed stereoscopically.

SUMMARY OF THE INVENTION

A liquid discharge apparatus according to one aspect of the present invention includes a liquid discharge head, a stimulation imparting unit, and a control unit. The liquid discharge head discharges stimulation hardening resin. The stimulation imparting unit imparts hardening stimulation to the discharged stimulation hardening resin. The control unit: controls the liquid discharge head based on lamination print data; forms a plurality of print layers each having a contour part; and changes a distance from the contour part in each of the print layers, based on data representing a correction amount with respect to a distance from the contour part in each of the print layers and a number of the print layers.

A liquid discharge apparatus according to another aspect of the present invention includes a liquid discharge head, a stimulation imparting unit, and a control unit. The liquid discharge head includes a plurality of liquid discharge nozzles discharging stimulation hardening resin. The stimulation imparting unit imparts hardening stimulation to the stimulation hardening resin. The control unit laminates print layers each having a plurality of contour parts based on lamination print data, and changes distances from the contour parts in the print layers, based on data representing a correction amount with respect to a distance from each of the contour parts in the print layers and a number of the print layers.

A method for manufacturing a lamination print according to another aspect of the present invention includes: inputting, to an image processing device, lamination print data in which data of a print layer having a plurality of contour parts is included; detecting the contour part of the print layer from the lamination print data; inputting, to the image processing device, correction data representing correction amounts with respect to distances from the contour parts in the plurality of print layers and a number of the print layers; changing, by the image processing device, the distance from the contour part in the lamination print data based on the correction data; and forming, by the image processing device, a lamination print based on the lamination print data in which the distance of the contour part is changed.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENT

Figure 1:
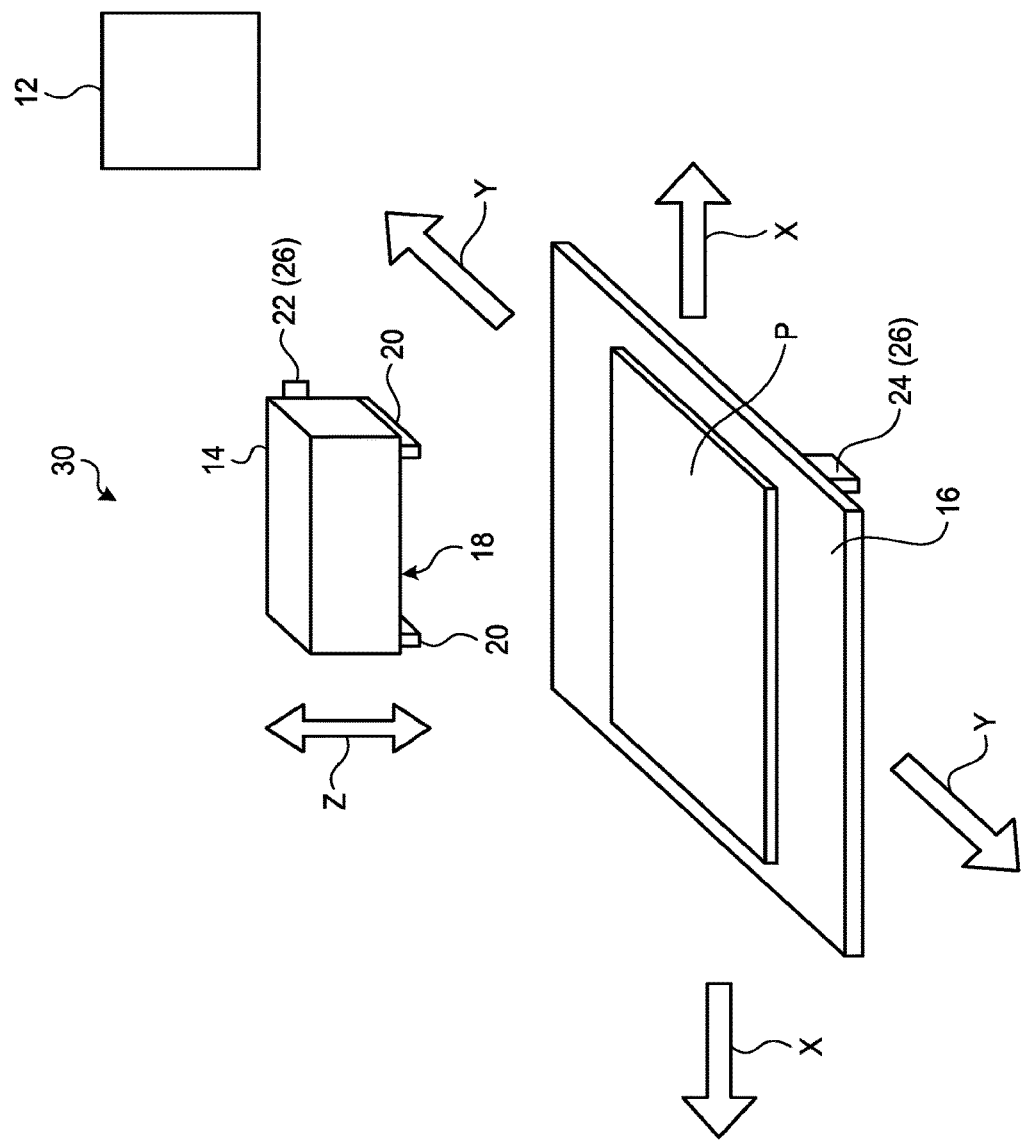
FIG. 1 is a diagram illustrating a configuration example of a liquid discharge apparatus.

The terminology used herein is for purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The present invention is directed to improvement of modeling quality of print.

An embodiment of a liquid discharge apparatus and a method for manufacturing a lamination print according to the present invention will be described in detail with reference to the accompanying drawings.

FIG. 1 is a diagram illustrating an example of a liquid discharge apparatus 10. The liquid discharge apparatus 10 includes an image processing device 12 and a recording device 30. The image processing device 12 and the recording device 30 are communicably connected to each other.

The recording device 30 includes a recording unit 14, an operation stage 16, and a drive unit 26. The recording unit 14 is provided with a plurality of nozzles 18. The recording unit 14 is an inkjet recording unit. The recording unit 14 records dots by discharging liquid droplets (liquid) from each of the nozzles 18. The nozzles 18 are provided to a surface that faces the operation stage 16 in the recording unit 14.

In the present embodiment, liquid droplets include at least ink droplets or additional liquid droplets. Ink droplets are droplets of ink including a color material used for image formation. In the present embodiment, an image means an image formed by ink.

The additional liquid droplets are droplets of a color that does not affect an image. The color of the additional liquid droplets is, for example, white or transparent. The additional liquid droplets may have a color similar to that of a supporting body P as an image forming object. The supporting body P is a forming target object of an image with ink droplets. Examples of the supporting body P include a recording medium. The supporting body P may be formed by discharging liquid droplets by an inkjet method and the like.

The ink droplets and the additional liquid droplets have stimulation hardening. Examples of the stimulation include light (ultraviolet ray, infrared ray, and the like), heat, and electricity. In the present embodiment, the ink droplets and the additional liquid droplets each having ultraviolet ray hardening are described as an example. The ink droplets and the additional liquid droplets are not limited to the ones having ultraviolet ray hardening.

Irradiation units 20 are provided to a surface facing the operation stage 16 in the recording unit 14. The irradiation units 20 irradiate the supporting body P with light of a wavelength for hardening the ink droplets and the additional liquid droplets discharged from the nozzles 18. In the present embodiment, the irradiation units 20 emit ultraviolet ray.

The operation stage 16 supports the supporting body P. The drive unit 26 relatively moves the recording unit 14 and the operation stage 16 in a vertical direction (arrow Z direction in FIG. 1), in a main-scanning direction X perpendicular to the vertical direction Z, and in a sub-scanning direction Y perpendicular to the vertical direction Z and the main-scanning direction X.

In the present embodiment, a flat surface formed of the main-scanning direction X and the sub-scanning direction Y corresponds to an XY flat surface along with a surface facing the recording unit 14 in the operation stage 16.

The drive unit 26 includes a first drive unit 22 and a second drive unit 24. The first drive unit 22 moves the recording unit 14 in the vertical direction Z, in the main-scanning direction X, and in the sub-scanning direction Y. The second drive unit 24 moves the operation stage 16 in the vertical direction Z, in the main-scanning direction X, and in the sub-scanning direction Y. The recording device 30 may include either the first drive unit 22 or the second drive unit 24.

Figure 2:
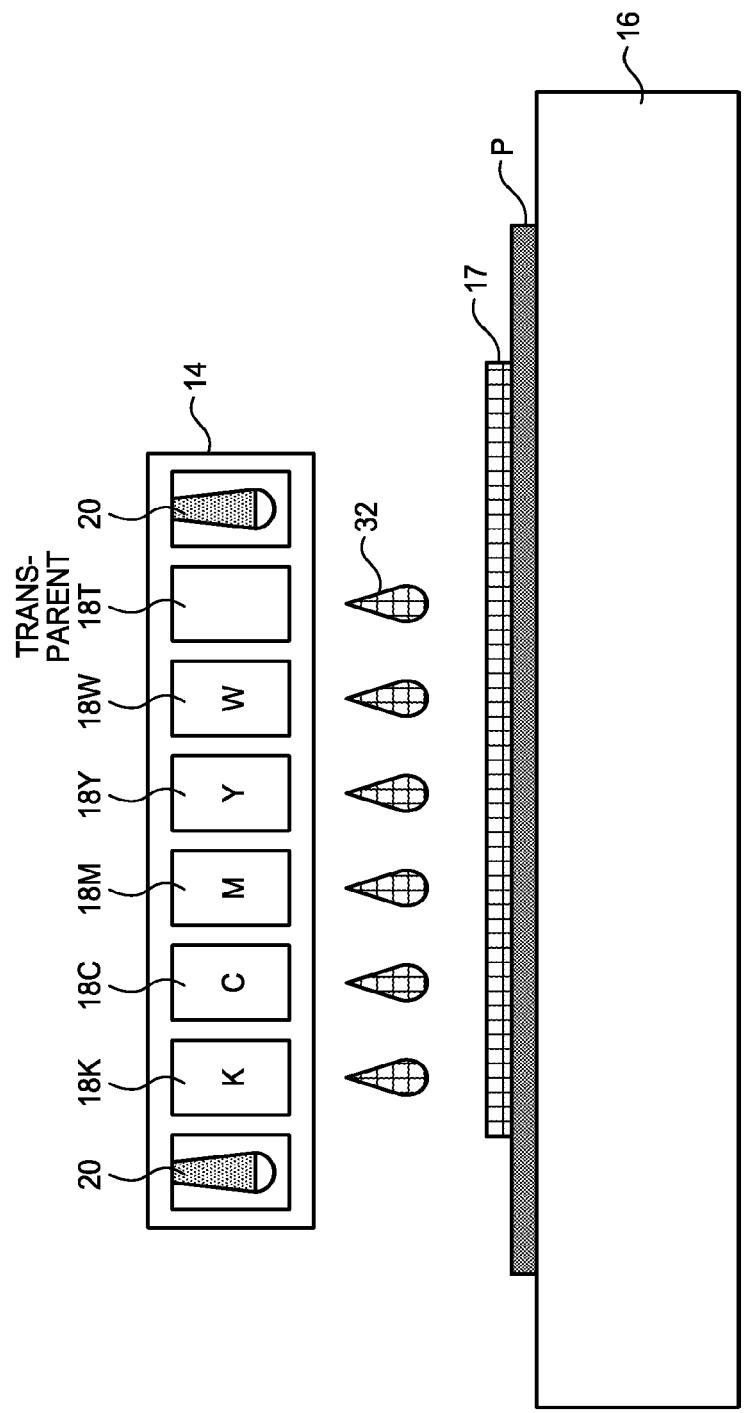
FIG. 2 is an explanatory diagram illustrating a recording unit.

FIG. 2 is an explanatory diagram illustrating the recording unit 14. The recording unit 14 has a configuration that the nozzles 18 (18K, 18C, 18M, 18Y, 18W, and 18T) are arranged in a predetermined direction. The nozzles 18 discharges, as liquid droplets 32, ink droplets 32A, additional liquid droplets 32B, or mixed liquid of the ink droplets 32A and the additional liquid droplets 32B. The nozzles 18 and the configuration for discharging liquid droplets are similar to those of the publicly known inkjet method.

In the present embodiment, the nozzles 18K, 18C, 18M, 18Y, 18W, and 18T are arranged in a predetermined direction. Among those, the nozzles 18K, 18C, 18M, and 18Y are the nozzles 18 that discharge the ink droplets 32A. Specifically, the nozzle 18K discharges ink droplets 32K of black. The nozzle 18C discharges ink droplets 32C of cyan. The nozzle 18M discharges ink droplets 32M of magenta. The nozzle 18Y discharges ink droplets 32Y of yellow.

The nozzles 18W and 18T are the nozzles 18 that discharge the additional liquid droplets 32B. Specifically, the nozzle 18W discharges additional liquid droplets 32W of white. The nozzle 18T discharges transparent additional liquid droplets 32T.

By discharging the liquid droplets 32 from each of the nozzles 18, dots corresponding to the liquid droplets 32 are formed on the supporting body P, and an image 17 having a color material included in the ink droplets 32A is formed. It is also possible to laminate dots 34 and form the stereoscopic image 17 by discharging the liquid droplets 32 in a laminate manner.

FIG. 2 illustrates a case where each of the nozzles 18 discharges the one-color (one kind of) liquid droplets 32. The nozzle 18 may discharge mixed liquid droplets of a plurality of kinds of the liquid droplets 32. Colors of ink discharged from the recording unit 14 are not limited to black, cyan, magenta, and yellow. The kinds of the liquid droplets 32 discharged from the recording unit 14 are not limited to six kinds (black, cyan, magenta, yellow, white, and transparency).

In the present embodiment, the irradiation unit 20 is provided to both end parts of the arrangement direction of the nozzles 18K, 18C, 18M, 18Y, 18W, and 18T. The liquid droplets 32 are hardened by irradiating, with light from the irradiation units 20, the liquid droplets 32 discharged from each of the nozzles 18. The irradiation units 20 are preferably arranged near the nozzles 18. Arranging the irradiation units 20 near the nozzles 18 enables a hardening time to be shortened, the hardening time being a time from when the liquid droplets 32 discharged from each of the nozzles 18 are attached to the supporting body P side to when the liquid droplets 32 are hardened. Thus, more high-definition image can be formed. The number of the irradiation units 20 and the installation position of the irradiation units 20 are not limited to the embodiment illustrated in FIG. 2.

Referring back to FIG. 1, in the recording device 30, dots of the liquid droplets 32 can be formed on the supporting body P and the dots can be laminated by relatively moving the recording unit 14 and the supporting body P while the liquid droplets 32 are discharged from the nozzles 18 of the recording unit 14. The supporting body P may have a planar shape and have a stereoscopic shape with recess and projection and the like.

Figure 3:
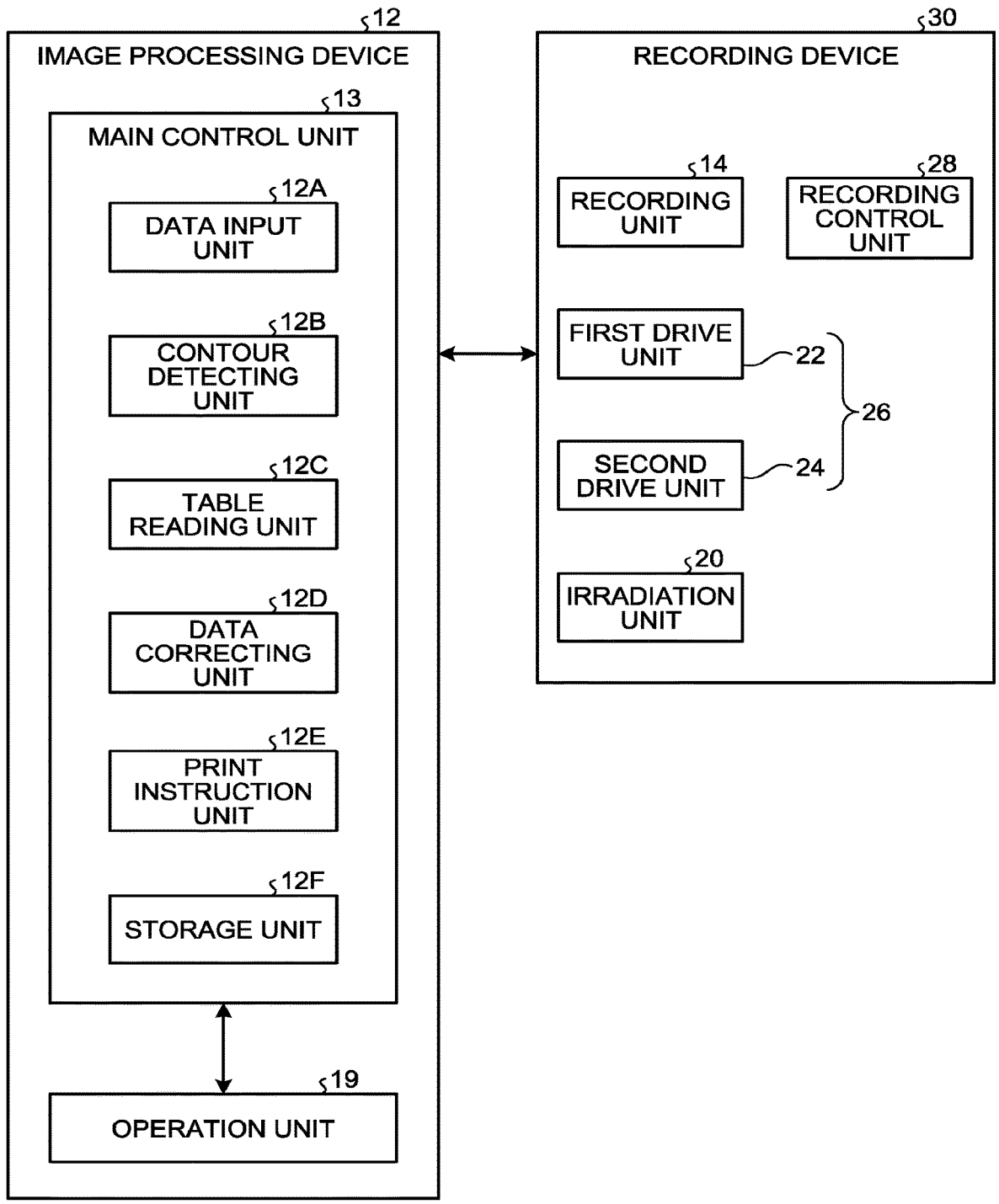
FIG. 3 is a functional block diagram illustrating the liquid discharge apparatus.

FIG. 3 is a functional block diagram illustrating the liquid discharge apparatus 10. The recording device 30 includes the recording unit 14, a recording control unit 28, the drive unit 26, and the irradiation units 20. The recording unit 14, the drive unit 26, and the irradiation units 20 have been described above, so that explanation thereof will be omitted.

The recording control unit 28 receives print data from the image processing device 12. The recording control unit 28 controls the recording unit 14, the drive unit 26, and the irradiation units 20 to discharge the liquid droplets 32 corresponding to each pixel from the nozzles 18 in accordance with the received print data. The recording control unit 28 may be implemented by a computer including a central processing unit (CPU), a read only memory (ROM), a random access memory (RAM), and the like, and may be implemented by circuitry and the like.

The image processing device 12 includes a main control unit 13 and an operation unit 19. The main control unit 13 is a computer that includes a CPU, a ROM, a RAM, and the like, and controls the whole image processing device 12. The main control unit 13 may be implemented by a component other than a general-purpose CPU. For example, the main control unit 13 may be implemented by circuitry and the like. The operation unit 19 is a monitor, a mouse, a keyboard, and the like, and provides a user interface.

The main control unit 13 includes a data input unit 12A, a contour detecting unit 12B, a table reading unit 12C, a data correcting unit 12D, a print instruction unit 12E, and a storage unit 12F. A part of or all of the data input unit 12A, the contour detecting unit 12B, the table reading unit 12C, the data correcting unit 12D, and the print instruction unit 12E may be implemented by causing a processing unit, for example, a CPU to execute a computer program, in other words, by software, may be implemented by hardware such as an integrated circuit (IC), and may be implemented by using software and hardware together.

The data input unit 12A has a function of inputting lamination print data (image data). The data input unit 12A may acquire lamination print data from an external device through a communication unit, or may acquire lamination print data from the storage unit 12F provided to the image processing device 12.

The contour detecting unit 12B has a function of detecting a contour part from the lamination print data input by the data input unit 12A. The method for detecting a contour part through image processing is a common method, and various kinds of methods are applicable.

The table reading unit 12C has a function of reading a correction table from the storage unit 12F and making the read table referable. The correction table represents correction amounts, each depending on a distance from a contour part and the total number of layers. The correction table may have the following contents that define each correction amount corresponding to an amount of protrusion to be reduced. Each correction amount is specified by a distance (mm) from a contour part and the total number of layers. The correction table may be prepared for each print mode.

TABLE 1

| | | Distance from contour part (mm) | | | | | |
|---|---|---|---|---|---|---|---|
| | | 1 | 2 | 3 | 4 | 5 | 6 |
| Total number of layers | 1 | −0.2 | −0.4 | −0.5 | −0.45 | −0.3 | −0.25 |
| | 2 | −0.4 | −0.8 | −1 | −0.9 | −0.6 | −0.5 |
| | 3 | −0.6 | −1.2 | −1.5 | −1.35 | −0.9 | −0.75 |
| | 4 | −0.8 | −1.6 | −2 | −1.8 | −1.2 | −1 |
| | 5 | −1 | −2 | −2.5 | −2.25 | −1.5 | −1.25 |
| | 6 | −1.2 | −2.4 | −3 | −2.7 | −1.8 | −1.5 |

The data correcting unit 12D has a function of performing correction for changing a shape of the lamination print data without protrusion of a contour part by referring to a correction table read by the table reading unit 12C about a contour part detected by the contour detecting unit 12B with respect to lamination print data input by the data input unit 12A. Details of this correction will be described later.

The print instruction unit 12E has a function of giving a print instruction to the recording device 30 based on the lamination print data corrected by the data correcting unit 12D.

The storage unit 12F has a function of storing the correction table described above and data to be processed and a computer program.

Figure 4:
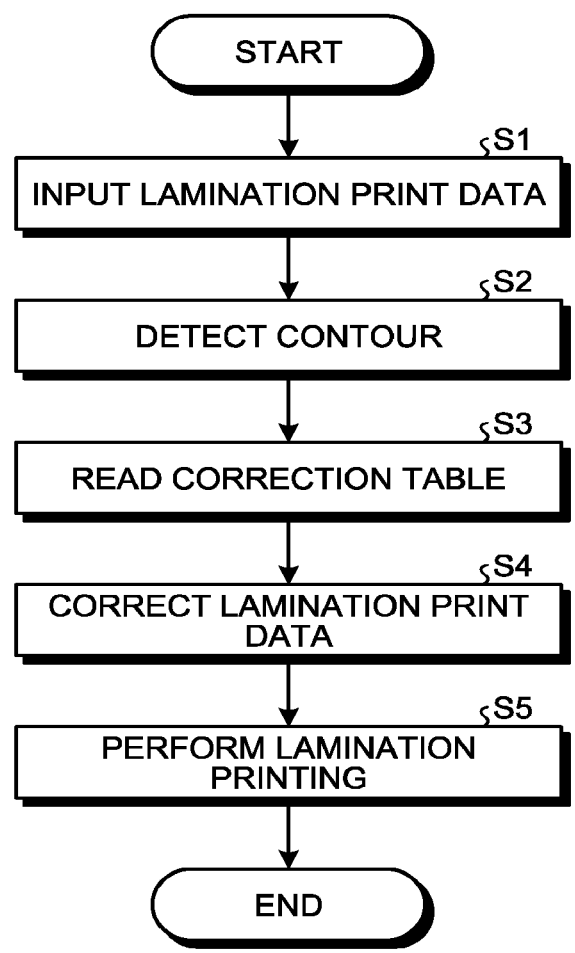
FIG. 4 is a flowchart illustrating a processing example of printing.

FIG. 4 is a flowchart illustrating a processing example of printing. In FIG. 4, the data input unit 12A inputs lamination print data (step S1). The lamination print data is, for example, image data illustrated in a cross-sectional view on the left side of FIG. 5A. This example illustrates a case where a stereoscopic object is formed by laminating layers L1 to L5.

Referring back to FIG. 4, the contour detecting unit 12B detects a contour part from the lamination print data input by the data input unit 12A (step S2). In the example of the cross-sectional view on the left side of FIG. 5A, both right and left ends of the layers L1 to L5 are detected as a contour part.

Referring back to FIG. 4, the table reading unit 12C reads a correction table from the storage unit 12F and makes the correction table referable (step S3). As described above, the correction table indicates the correction amount depending on a distance from a contour part and the total number of layers.

Subsequently, the data correcting unit 12D refers to the correction table read by the table reading unit 12C about the contour part detected by the contour detecting unit 12B with respect to the lamination print data input by the data input unit 12A and performs correction for changing a shape of the lamination print data so as not to arise protrusion of the contour part (step S4).

Specifically, correction is performed by the following procedures. The data correcting unit 12D obtains the total number of layers from lamination print data. Subsequently, the data correcting unit 12D acquires the correction amount corresponding to a distance from a contour by using a correction table based on the obtained total number of layers. Subsequently, the data correcting unit 12D performs correction for changing a shape of the lamination print data based on the acquired correction amount.

In this case, correction for changing a shape is performed for each layer, for example. Part to be deleted in a shape of one layer, or part to be deleted in a shape of two layers are defined by rounding-off and the like, and a layer or layers to be applied such part is/are defined. Then, a shape of a contour part in the defined layer is changed (partly deleted).

Figure 5A:
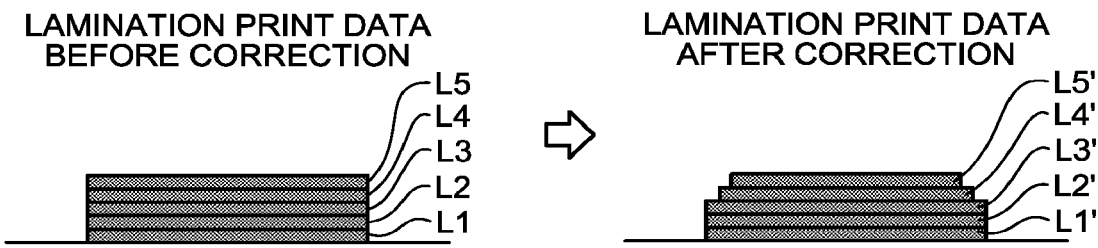
FIG. 5A is a diagram illustrating an example of lamination print data before correction and lamination print data after correction.
Figure 5B:
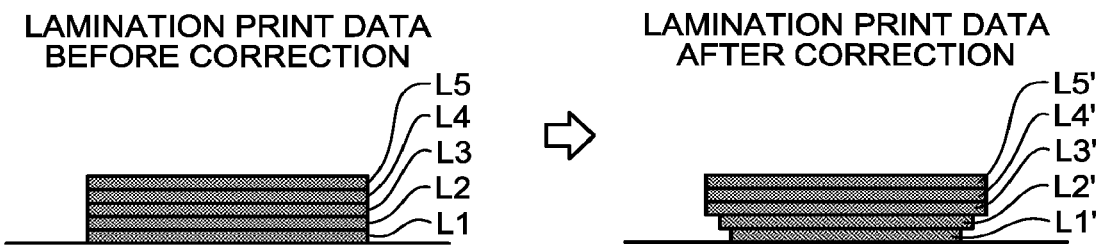
FIG. 5B is a diagram illustrating an example of lamination print data before correction and lamination print data after correction.
Figure 5C:
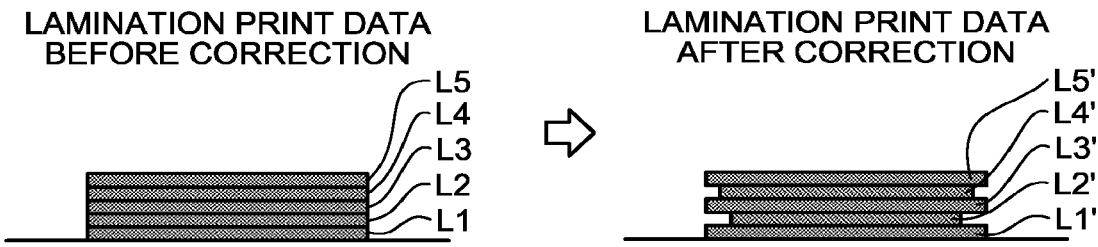
FIG. 5C is a diagram illustrating an example of lamination print data before correction and lamination print data after correction.

FIGS. 5A to 5C are diagrams illustrating examples of lamination print data before correction and lamination print data after correction, and illustrating cross-sectional shapes represented by data. In FIG. 5A, among lamination print data in which the layers L1 to L5 of the same shape are laminated, shapes of the fourth layer L4 and the fifth layer L5 are changed (shapes of end parts are deleted), and the changed L4 and L5 are defined as L4' and L5'. The first to third layers L1 to L3 are not changed but are defined as L1' to L3'.

In FIG. 5B, among lamination print data in which the layers L1 to L5 of the same shape are laminated, shapes of the first layer L1 and the second layer L2 are changed (shapes of end parts are deleted), and the changed L1 and L2 are defined as L1' and L2'. The third to fifth layers L3 to L5 are not changed but are defined as L3' to L5'.

In FIG. 5C, among lamination print data in which the layers L1 to L5 of the same shape are laminated, shapes of the second layer L2 and the fourth layer L4 are changed (shapes of end parts are deleted), and the changed L2 and L4 are defined as L2' and L4'. The first, the third, and the fifth layers L1, L3, and L5 are not changed but are defined as L1', L3', and L5'. The layer to be changed in shape is appropriately selected depending on characteristics of ink and a base material, a shape of a forming object, and the like. A correction table may include information about a layer whose shape is to be changed.

Figure 5D:
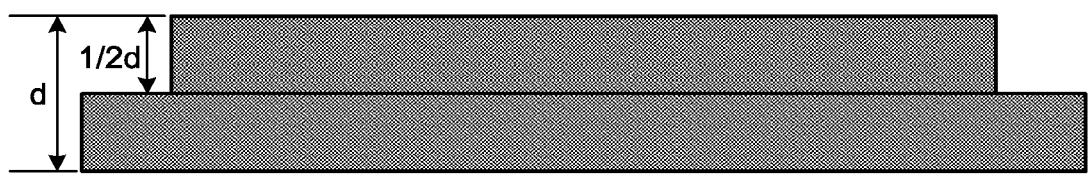
FIG. 5D is a diagram illustrating an example of lamination print data after correction.

As illustrated in FIG. 5D, the data correcting unit 12D can perform correction for changing a shape by half layer (0.5 layer) in place of by one layer. When the correction is applied to only half thickness (½d) of a thickness (d) of a layer, it is possible to adjust an amount of liquid droplets by reducing the size of ink droplets forming a layer or intermittently removing the ink droplets. This manner enables the thickness to be finely adjusted at multiple stages. For example, when an acquired value from a correction table is a decimal, such as 0.5 layer, ink droplets forming one layer are made smaller or are replaced with different-sized droplets so as to form a thin layer such as 0.5 layer. In addition, thickness may be adjusted by unit smaller than 0.5 layer (for example, 0.2 layer and 0.1 layer).

Referring back to FIG. 4, the print instruction unit 12E gives a print instruction to the recording device 30 based on the lamination print data corrected by the data correcting unit 12D (step S5).

Figure 6A:
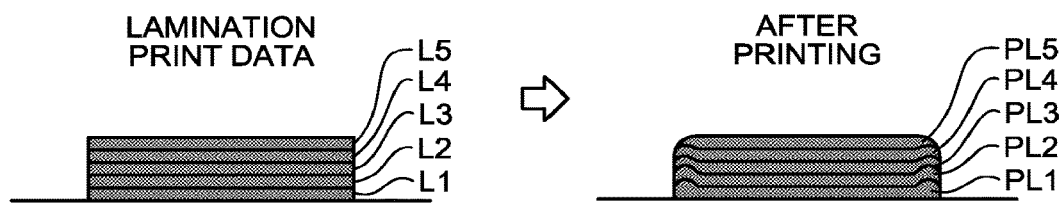
FIG. 6A is a cross-sectional view illustrating a state after printing corresponding to lamination print data.

FIG. 6A is a cross-sectional diagram illustrating a state after printing corresponding to lamination print data, and illustrates a print result obtained by performing, for example, correction in FIG. 5A. In layers PL1 to PL3 formed by printing, protrusion is generated on a contour part. In layers PL4 and PL5, protrusion is prevented as a whole and a contour part is flat because a change in shape causes a discharge amount to be reduced.

Figure 6B:
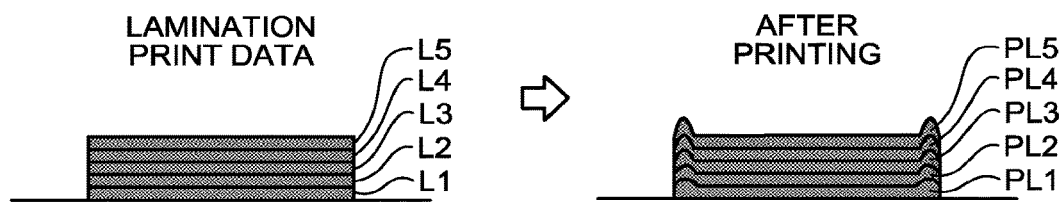
FIG. 6B is a cross-sectional view illustrating a state after printing corresponding to lamination print data.

As a comparison example, FIG. 6B is a cross-sectional diagram illustrating a state after printing corresponding to lamination print data when correction is not performed. In each of the layers PL1 to PL5 formed by printing, protrusion is generated on a contour part, and the raise is larger as a whole.

Figure 6C:
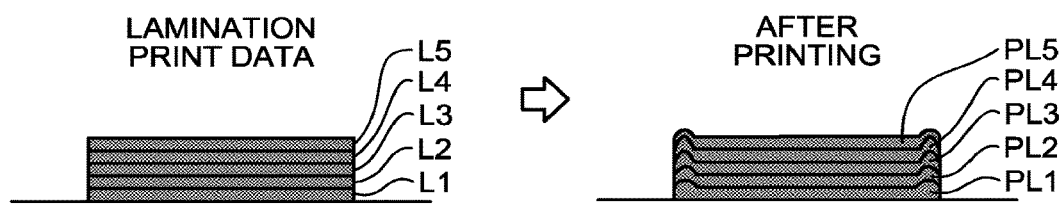
FIG. 6C is a cross-sectional view illustrating a state after printing corresponding to lamination print data.

As another comparison example, FIG. 6C is a cross-sectional diagram illustrating a state after printing corresponding to lamination print data when droplets forming a contour part of a last-laminated color image are intermittently removed. In each of the layers PL1 to PL4 formed by printing, protrusion is generated on a contour part. In the layer PL5 of the last color image, droplets are intermittently removed, but this removal has not gone far enough to prevent the whole raise.

Processing in FIG. 4 is implemented by, for example, a computer program executed in the image processing device 12 of the liquid discharge apparatus 10. The computer program is provided by being preliminarily incorporated in, for example, a ROM. The computer program may be provided by a data file in an installable format or in an executable format, and be recorded in computer-readable recording media such as a compact disc read only memory (CD-ROM), a flexible disk (FD), a compact disc recordable (CD-R), and a digital versatile disc (DVD). In addition, the computer program may be provided by being stored in a computer connected to a network such as the Internet and be downloaded through the network. The computer program may be provided or distributed through a network such as the Internet. The computer program has a module configuration that includes the image processing device 12 described above or the components thereof (the data input unit 12A, the contour detecting unit 12B, the table reading unit 12C, the data correcting unit 12D, the print instruction unit 12E, and the like). As actual hardware, a CPU (processor) loads and executes the computer program from the ROM so as to load each of the units described above on a main storage device and generate the image processing device 12, the data input unit 12A, the contour detecting unit 12B, the table reading unit 12C, the data correcting unit 12D, the print instruction unit 12E, and the like on the main storage device.

As described above, according to the present embodiment, modeling quality can be improved.

An inkjet printer is mainly described as an example of the liquid discharge apparatus, but the liquid discharge apparatus is not limited to the inkjet printer.

This liquid discharge apparatus can include a means related to feeding of an object to which liquid can be attached, conveyance, and paper ejection, other means, a preprocessing device, a post-processing device, and the like.

Examples of the liquid discharge apparatus include an image forming device that discharges ink to form an image on paper and a stereoscopic modeling device (three-dimensional modeling device) that discharges modeling liquid to a powder layer in which powder is formed in a layer shape in order to model a stereoscopic modeling object (three-dimensional modeling object).

The liquid discharge apparatus is not limited to a device that visualizes a significant image such as characters and graphics with discharged liquid. Examples of the liquid discharge apparatus include a device that forms a pattern or the like having no meaning by itself and a device that models a three-dimensional image.

The "object to which liquid can be attached" described above is the one to which liquid can be at least temporarily attached, and means an object to which liquid is attached and adheres, an object to which liquid is attached and penetrates, and the like. Specific examples include recorded media such as paper, recording paper, a recording sheet, a film, and cloth, electronic components such as an electronic substrate and a piezoelectric element, and media such as a powder layer (powdered layer), an organ model, and a cell for testing, and include, unless otherwise limited, every object to which liquid is attached.

A material of the "object to which liquid can be attached" described above may be a material to which liquid can be temporarily attached, such as paper, string, fiber, cloth, leather, metal, plastic, glass, wood, and ceramics.

The "liquid" may be liquid that has viscosity and surface tension for allowing the liquid to be discharged from a head. Liquid is not specifically limited, but under a normal temperature and normal pressure, the liquid preferably has viscosity of 30 mPa·s or less by heating and cooling. More specifically, examples of liquid include solution, suspension, emulsion, and the like that contain solvents such as water and an organic solvent, colorant such as dye and pigment, function providing materials such as a polymerizable compound, resin, and a surfactant, biomaterials such as deoxyribonucleic acid (DNA), an amino acid and protein, and calcium, edible materials such as a natural pigment, and the like. These can be used for purposes of, for example, inkjet ink, surface processing liquid, liquid for forming components such as an electron element and a light-emitting element and electronic circuit resist patterns, and material liquid for three-dimensional modeling.

Examples of an energy generation source discharging liquid include an energy generation source that uses a piezoelectric actuator (a lamination type piezoelectric element and a thin-film type piezoelectric element), a thermal actuator using electrothermal conversion elements such as a heating resistor, a static actuator formed of a diaphragm and an opposite electrode, and the like.

The liquid discharge apparatus is assumed to be an apparatus that relatively moves a liquid discharge head and an object to which liquid can be attached, but the liquid discharge apparatus is not limited to this. Specific examples of the liquid discharge apparatus include a serial type device that moves a liquid discharge head and a line type device that does not move a liquid discharge head.

Other examples of the liquid discharge apparatus include a processing liquid application device that discharges processing liquid on paper in order to apply the processing liquid on a surface of the paper for the purpose of improving quality of a surface of the paper and an injection granulation device that injects composition liquid in which a raw material is dispersed in solution through a nozzle so as to granulate fine particles of the raw material.

In the present application, all of the following words: image forming, recording, typing, image printing, printing, and modeling are defined as a synonym.

According to the present invention, modeling quality can be improved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A liquid discharge apparatus comprising:
   a liquid discharge head that discharges stimulation hardening resin;
   a stimulation imparting unit that imparts hardening stimulation to the discharged stimulation hardening resin; and
   a control unit that
      controls the liquid discharge head based on lamination print data,
      forms a plurality of print layers each having a contour part, and
      changes a distance from the contour part in each of the print layers, based on data representing a correction amount with respect to a distance from the contour part in each of the print layers and a number of the print layers.

2. The liquid discharge apparatus according to claim 1, wherein the control unit holds the data for each print mode.

3. The liquid discharge apparatus according to claim 1, wherein the control unit holds the data as a table.

4. The liquid discharge apparatus according to claim 1, wherein the control unit performs correction for reducing a distance from a contour part in each of one or more print layers included in the lamination print data.

5. The liquid discharge apparatus according to claim 4, wherein the control unit carries out the correction by reducing, toward the upper layers, the distance from the contour part in each of one or more print layers included in the lamination print data.

6. The liquid discharge apparatus according to claim 1, wherein the control unit performs correction for reducing a thickness of a contour part in each of one or more print layers included in the lamination print data.

7. The liquid discharge apparatus according to claim 1, wherein
   the stimulation hardening resin is ultraviolet ray hardening resin, and
   the stimulation imparting unit is an ultraviolet ray irradiation unit.

8. A liquid discharge apparatus comprising:
   a liquid discharge head that includes a plurality of liquid discharge nozzles discharging stimulation hardening resin;

a stimulation imparting unit that imparts hardening stimulation to the stimulation hardening resin; and a control unit that laminates print layers each having a plurality of contour parts based on lamination print data, and changes distances from the contour parts in the print layers, based on data representing a correction amount with respect to a distance from each of the contour parts in the print layers and a number of the print layers.

9. The liquid discharge apparatus according to claim 8, wherein the control unit holds the data each print mode.

10. The liquid discharge apparatus according to claim 8, wherein the control unit holds the data as a table.

11. The liquid discharge apparatus according to claim 8, wherein the control unit performs correction for reducing a distance from a contour part in each of one or more print layers included in the lamination print data.

12. The liquid discharge apparatus according to claim 11, wherein the control unit carries out the correction by reducing, toward the upper layers, the distance from the contour part in each of one or more print layers included in the lamination print data.

13. The liquid discharge apparatus according to claim 8, wherein the control unit performs correction for reducing a thickness of a contour part in each of one or more print layers included in the lamination print data.

14. The liquid discharge apparatus according to claim 8, wherein the stimulation hardening resin is ultraviolet ray hardening resin, and the stimulation imparting unit is an ultraviolet ray irradiation unit provided near the liquid discharge head.

15. A method for manufacturing a lamination print, the method comprising:

inputting, to an image processing device, lamination print data in which data of a plurality of print layers having a plurality of contour parts is included;

detecting the contour parts of the print layers from the lamination print data;

inputting, to the image processing device, correction data representing correction amounts with respect to distances from the contour parts in the plurality of print layers and a number of the print layers;

changing, by the image processing device, the distance from the contour part, of at least one layer, in the lamination print data based on the correction data; and forming, by the image processing device, a lamination print based on the lamination print data in which the distance of the contour part of at least one layer is changed.

16. The method according to claim 15, wherein the correction data is prepared for each print mode.

17. The method according to claim 15, wherein the correction data is held and input as a table.

18. The method according to claim 15, wherein the changing the distance from the contour part is carried out by correction for reducing the distance from the contour part.

19. The method according to claim 18, wherein the correction is correction for reducing the distance from the contour part toward upper layers.

20. The method according to claim 15, wherein the changing the distance from the contour part is carried out by correction for reducing a thickness of the contour part.

* * * * *